United States Patent [19]

Jaster

[11] 4,323,109
[45] Apr. 6, 1982

[54] OPEN CYCLE HEAT PUMP SYSTEM AND PROCESS FOR TRANSFERRING HEAT

[75] Inventor: Heinz Jaster, Schenectady, N.Y.
[73] Assignee: General Electric Company, Schenectady, N.Y.
[21] Appl. No.: 69,776
[22] Filed: Aug. 27, 1979
[51] Int. Cl.³ .............................................. F28C 3/08
[52] U.S. Cl. ........................................ 165/1; 237/2 B; 237/80; 165/45; 62/510
[58] Field of Search .................... 237/2 B, 11; 62/304, 62/324 B, 238 E, 238.6, 324.1, 510; 165/45, 1; 60/641.5

[56] References Cited

U.S. PATENT DOCUMENTS 4,149,585  4/1979  Sterlini .................................. 165/1

OTHER PUBLICATIONS

Neil, D. T. and Jensen W. P. *Geothermal Powered Heat Pumps*, Eleventh Report of Inter-Society of Energy Conservation, p. 803, Sep. 1976.
Westinghouse, *Templifier Heat Pump*, Descriptive Bulletin, Apr. 1978.
Wood, D. Applications of Thermodynamics Addison-Wesley, p. 188, 1969.
Ambrose, *Heating, Piping, Air Conditioning*, pp. 81–82, May, 1974.
Jaster, *Heat Pump Limitations*, G.E. Report No. 75 CRD 185, pp. 5–18, Sep. 1975.

*Primary Examiner*—Albert J. Makay
*Assistant Examiner*—Henry Bennett
*Attorney, Agent, or Firm*—Marvin Snyder; James C. Davis, Jr.

[57] ABSTRACT

Two or more open cycle vapor compression heat pumps of interdependently different capacities are placed in parallel arrangement intermediate a heat sink and a heat source for the transfer of sensible heat therebetween.

4 Claims, 2 Drawing Figures

OPEN CYCLE HEAT PUMP SYSTEM AND PROCESS FOR TRANSFERRING HEAT

BACKGROUND OF THE INVENTION

This invention relates to open cycle vapor compression heat pumps and, more particularly, to a system and a process employing open cycle vapor compression heat pumps in a parallel arrangement to transfer heat.

Conventional heat pumps provide either heat or refrigeration by employing a vapor compression cycle to transfer heat between a heat source and a heat sink. In operation, a simple cycle heat pump adds sufficient heat by compression to a working fluid vapor to raise the heat content of the vapor from the level of the heat source to that of the heat sink. The efficiency of such a cycle is given in terms of its Coefficient Of Performance (COP), which is approximately proportional to $T_H/(T_H-T_L)$ where $T_H$ and $T_L$ are the absolute temperatures of the heat sink and of the heat source respectively.

Heat pump efficiency can be increased through the modification of this simple vapor compression cycle to include multi-stage compression as described in "Applications of Thermodynamics" by Bernard D. Wood (Addison-Wesley Publishing Company, 1969) pages 186–188. In this configuration the heat of compression is imparted into working fluid vapor through a progression of series-connected compressive stages. However, as in the simple cycle, the multi-stage heat pump requires that sufficient heat of compression be added to raise the heat content of the entire working fluid vapor flow from the heat level of the heat source to that of the heat sink.

Greater efficiency can be achieved in a heat pump system wherein a plurality of heat pumps are arranged in parallel intermediate a heat sink and a heat source, with each heat pump having a predeterminedly different thermal transfer capacity. Thusly, each of the working fluid flows is imparted with a distinctly different amount of heat energy corresponding to the capacity of its respective heat pump.

In such a parallel-arranged system only one heat pump operates between the entire heat source/heat sink temperature range, and thus has a COP proportional to that of the simple single-flow heat pump system (re: COP$\alpha T_H/T_H-T_L$). The remaining heat pumps operate between a reduced temperature range, and thus have higher COP's than that associated with the simple cycle system, thereby making the combined COP of the parallel-arranged system greater than for a comparable simple single-flow system. For example, in a parallel-arranged heat pump system operating in a cooling mode between $T_H$ and $T_L$, a first heat pump might operate between $T_L$ and $T_1$, with $T_1<T_H$. Therefore $COP_1=T_1/(T_1-T_L)>T_H/(T_H-T_L)$.

The Templifier ® industrial heat pump system commercially available from the Westinghouse Corporation apparently utilizes a concept somewhat related to that of a parallel-arranged heat pump system. However, the Templifier ® system employs closed cycle heat pumps, and does not therefore enjoy the benefits associated with open cycle heat pumps. In particular, open cycle heat pumps do not require heat exchangers as do closed cycle designs, thereby resulting in capital cost and space savings and in the beneficial elimination of inefficient temperature drops attendant the use of heat exchangers. Moreover, the seals often required to isolate different liquid-based flows in closed cycle heat pumps are not required in open cycle designs.

An example of an open cycle heat pump is contained in the Article "Geothermal Powered Heat Pumps to Produce Process Heat" by D. T. Neill and W. P. Jensen (11th Report of the Intersociety Energy Conservation and Engineering Conference, September, 1976). However, the Neill, et al system does not include parallel arranged heat pumps and thus does not obtain the benefits derivable therefrom.

Accordingly, an object of the present invention is to provide a new and improved heat pump system.

Another object of the present invention is to provide a heat pump system with an improved coefficient of performance.

Another object of the present invention is to provide a new and improved heat pump system with the advantages attendant an open cycle system.

Still another object of the present invention is to provide a process for transferring heat from a heat source to a heat sink which eliminates the inefficiencies of a closed cycle device and which exhibits an improved coefficient of performance.

SUMMARY OF THE INVENTION

The above and other objects and advantages are achieved in an open cycle heat pump system and process for transferring heat between a heat source and a heat sink, which system comprises a plurality of compressor means arranged in parallel intermediate a heat source and a heat sink. Additionally, each of the compressor means exhibits a predeterminately different capacity for transferring heat to an associated flow of working fluid vapor.

BRIEF DESCRIPTION OF THE DRAWING

For a better understanding of the invention reference may be had to the accompanying drawing wherein.

DESCRIPTION OF THE INVENTION

Figure 1:
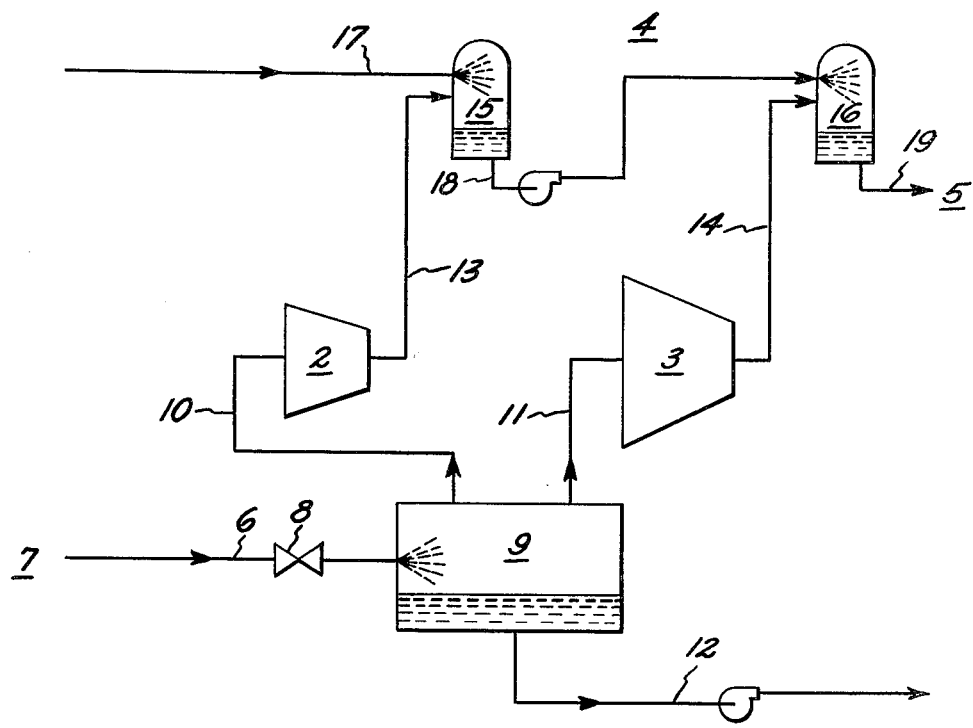
FIG. 1 is a schematic representation of an embodiment of the subject invention operating in a heating mode with respect to a heat sink fluid.
Figure 2:
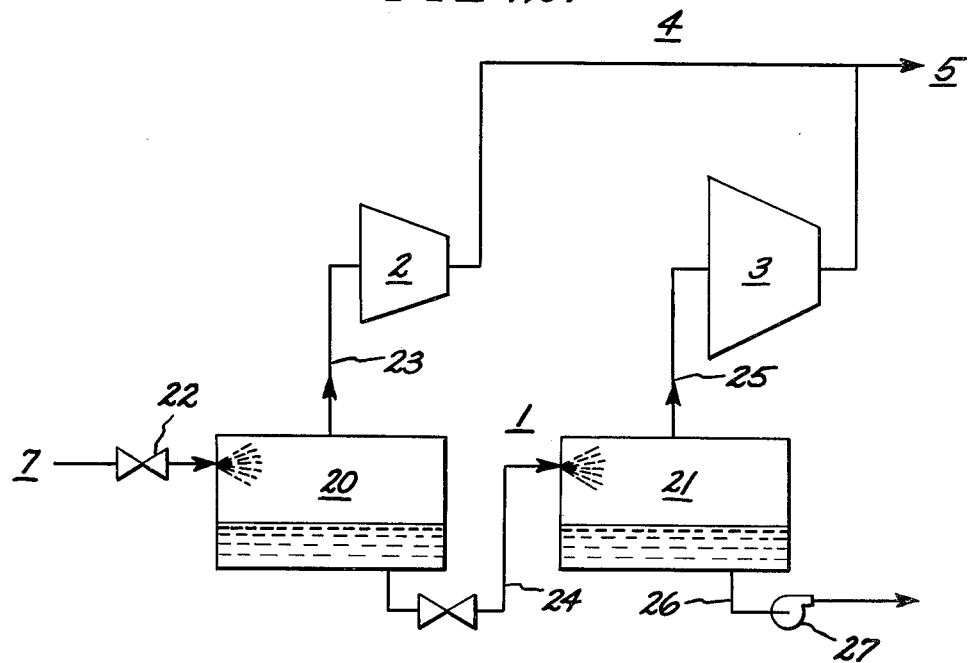
FIG. 2 is a schematic representation of an alternative embodiment of the subject invention operating in a cooling mode with respect to a heat source fluid.

As illustrated in both FIGS. 1 and 2, heat is added to a heat sink fluid in two parallel-arranged steps. Flows of heat source fluid vapor are supplied by a means 1 to a pair of parallel-arranged compressors, 2 and 3, wherein each of the flows receives a predeterminedly different amount of heat during compression. Means 4 are provided for conveying the compressed source vapor from compressors 2 and 3 to a heat sink 5.

More specifically, in the embodiment of the invention depicted in FIG. 1, heated fluid is conveyed in a conduit 6 from a heat source 7 through an expansion valve 8 to a flash chamber 9. The resulting source vapor is conveyed in a parallel-arrangement to the compressors 2 and 3 by conduits 10 and 11. Excess source liquid is removed from the flash chamber 9 through a drain 12.

The parallel-arranged compressors 2 and 3 exhibit predeterminately different capacities to transfer heat to their respective flows of source vapor. Thus, the compressed source vapor conveyed from the exhaust of the compressor 2 through a conduit 13 will typically have a lower pressure than the compressed vapor exhausted from the compressor 3 through a conduit 14.

The compressed vapor flows from both of the compressors 2 and 3 are conveyed to a heat sink 5 through a means 4, which in the present embodiment includes a pair of sequentially connected mixing chambers 15 and 16. These mixing chambers may be of the type described in copending patent application Ser. No. 33,177 filed Apr. 25, 1979 and assigned to the same assignee as the present invention. Thus, heat sink fluid supplied to the mixing chamber 15 through a conduit 17 is directly contacted therein with pressurized superheated source vapor entering the chamber from the conduit 13. The heat sink fluid employed herein is preferably of the same predominant liquid content or "liquid base" as is the heat source fluid. The resulting heated liquid is separated in the mixing chamber 15 by gravity and is transferred to the mixing chamber 16 through a conduit 18.

The heated liquid supplied by the conduit 18 is sprayed in the mixing chamber 16 and is therein placed in direct contact with the pressurized superheated vapor exhausted from the compressor 3 and entering the chamber 16 through the conduit 14. The resulting heated liquid is separated by gravity in the chamber 16 and is withdrawn through a conduit 19 to the heat sink 5.

In the alternative embodiment of this invention illustrated in FIG. 2, a flow of fluid from a heat source 7 is cooled in two steps in a parallel-arranged heat pump system. Source vapor is supplied to compressors 2 and 3 by a means 1, which in this embodiment includes two sequentially connected flash chambers 20 and 21.

Heat source fluid is supplied to the flash chamber 20 after negotiating an expansion valve 22. Source vapor is removed from the chamber 20 through a conduit 23 to supply the compressor 2. Heat source fluid liquid is separated in the chamber 20 by gravity and is conveyed to the lower pressure flash chamber 21 through a conduit 24. Source fluid vapor is transferred from the flash chamber 21 to the compressor 3 through a conduit 25. Excess source fluid liquid is separated from source vapor in the chamber 21 by gravity and is drained from the chamber through an outlet 26.

As in the embodiment of the invention described hereinabove, the parallel arranged compressors 2 and 3 have predeterminately different capacities for imparting heat to their associated flows of source vapor. The resulting pressurized vapor flows exhausted by the compressors 2 and 3 are intermixed in the means 4 and conveyed to the heat sink 5.

In operation, the system illustrated in FIG. 2 might typically operate to reduce the temperature of a heat source fluid entering the system from the heat source 7 at a temperature of 150° F. to a temperature of 100° F. at the fluid outlet 26. In this example, water flowing from a heat source would enter the expansion valve 22 at a temperature of 150° F. and a pressure of 15 PSIA. After negotiating the expansion valve the source fluid would enter the flash chamber 20 at a reduced temperature and pressure of 125° F. and 2 PSIA respectively. The source vapor transferred to the compressor 2 through the conduit 23 would comprise approximately 2.5 percent of the original source fluid mass flow. Sufficient heat is transferred to the source vapor in the compressor 2 to raise its temperature to 578° F. and its pressure to 14.6 PSIA. The remaining source fluid would be removed in liquid form from the flash chamber 20 at 125° F. and 2 PSIA and would enter the flash chamber 21 at a temperature of 100° F. and a pressure of 1 PSIA after negotiating an expansion valve in the conduit 24. The source liquid, separated from the source vapor in the chamber 21 by gravity and comprising approximately 95.2 percent of the original source fluid flow would be removed from the system by the pump 27 through the line 26 at a final temperature of 100° F. and a pressure of 15 PSIA.

Meanwhile, approximately 2.3 percent of the original source fluid is transferred in vapor form from the flash chamber 21 to the compressor 3 through the conduit 25. Sufficient heat is imparted to the vapor in the compressor 3 to raise the influent vapor to a temperature of 743° F. and a pressure of 14.6 PSIA at the compressor exhaust. After intermixing in the means 4 for conveying the resultant source vapor to the heat sink 5, the resultant mixture, which would typically represent 4.8 percent of the original source fluid mass flow, would have a temperature of approximately 659° F. and a pressure of 14.6 PSIA. The coefficient of performance for the total system would be approximately 4.88.

The above described embodiment of this invention is intended to be exemplative only and not limiting, and it will be appreciated from the foregoing by those skilled in the art that many substitutions, alterations and changes may be made to the disclosed structures and processes without department from the spirit or scope of the invention.

What I claim as new and desire to secure by Letters Patent of the United States is:

1. An open cycle heat transfer system for transferring heat from a heat source to a heat sink comprising:
    a means cooperating with said heat source for supplying source vapor;
    a plurality of compressor means in parallel-arranged vapor communication with said source vapor supply means, with individual ones of said compressor means having predeterminately different capacities with respect to each other for raising the temperature and pressure of source vapor flowing therethrough;
    means for conveying source vapor from said compressor means, said conveying means being in flow communication with said heat sink;
    wherein said source vapor conveying means includes a plurality of mixing chambers, with individual ones of said chambers each being in vapor communication with the exhaust of a cooperating one of said compressor means and being in flow communication with a means for supplying fluid of substantially the same liquid base as said source vapor, said mixing chambers being so arranged as to provide for the direct contacting of said fluid and said source vapor therein; and
    wherein said plurality of mixing chambers are in flow communication with said means for supplying fluid in order of increasing capacity of the compressor means cooperating therewith.

2. A process for transferring heat from a heat source fluid to a heat sink in an open cycle system comprising the steps of:
    diverting source vapor from said heat source fluid in a plurality of parallel flows between said heat source fluid and said heat sink;
    adding an amount of heat by compression to the source vapor in each of said parallel-arranged flows, said amount of heat being different per volume of vapor for each of said parallel-arranged flows;

recombining the compressed vapor from said parallel-arranged flows; and transferring heat from said combined compressed vapor to said heat sink;

wherein said heat source fluid is conveyed sequentially through a series of decreasing temperature flash chambers to generate source vapor, and said source vapor generated in each of said flash chambers is conveyed to a cooperating compressor means for the addition of heat thereto.

3. An open cycle heat transfer system for transferring heat from a heat source to a heat sink comprising:

a means cooperating with said heat source for supplying source vapor;

a plurality of compressor means in parallel-arranged vapor communication with said source vapor supply means, with individual ones of said compressor means having predeterminately different capacities with respect to each other for raising the temperature and pressure of source vapor flowing therethrough;

means for conveying source vapor from said compressor means, said conveying means being in flow communication with said heat sink; and wherein said means for supplying source vapor comprises a plurality of flash chambers, disposed in sequential flow communication with a flow of heat source fluid, in order of decreasing source fluid temperature, and wherein individual ones of said flash chambers are each in vapor communication with the inlet of a cooperating one of said compressor means.

4. An open cycle heat transfer system as in claim 3 wherein the consecutive ones of said compressor means cooperating with said sequentially disposed flash chambers have a capacity to raise the temperature and pressure of an associated flow of source of vapor greater than such capacity of the next preceding one of said compressor means.

* * * * *